July 14, 1942.     R. W. PARKER     2,289,929

DIE CASTING MACHINE

Filed Dec. 14, 1940

INVENTOR
Robert W. Parker.
BY
ATTORNEYS

Patented July 14, 1942

2,289,929

UNITED STATES PATENT OFFICE 2,289,929

DIE CASTING MACHINE

Robert W. Parker, Erie, Pa., assignor to Parker White-Metal & Machine Co., a partnership composed of Norman A. Parker, Robert W. Parker, Jessie M. Parker, and E. Lucille Parker Application December 14, 1940, Serial No. 370,220

4 Claims. (Cl. 22—122)

Some types of fuses are provided with glass shells which include a filler and a fuse with connecting caps. Difficulty has been experienced in connecting the securing means for the fuse to the glass. Attempts have been made to secure the caps to the glass through a die casting method, die casting a shell extending down the glass and including the cap.

Slight variations in the glass result in either a failure to make a closure of the mold or in cracking the glass as the mold is closed. In the present invention this difficulty is overcome by forming that part of the mold which engages the glass of yielding material such as rubber, the rubber not only holding the glass in place in the mold, but forming the closure for the mold cavity at the end of the yielding material. Features and details of the invention will appear from the specification and claims.

Figure 1:
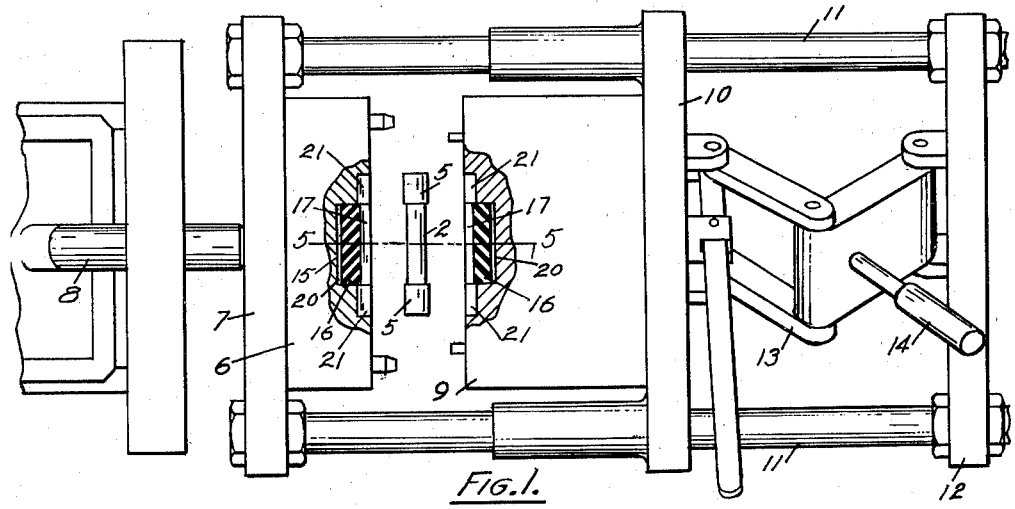

A preferred embodiment of the invention is illustrated in the accompanying drawing as follows:

Fig. 1 shows a plan view of a die casting machine.

Figure 2:
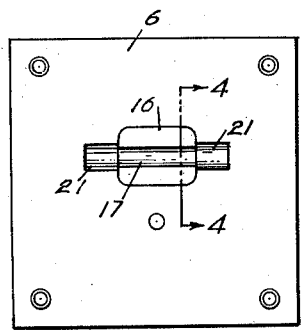

Fig. 2 a plan view of one of the movable molds.

Figure 3:
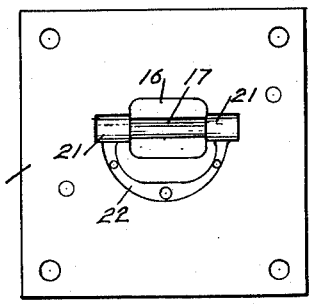

Fig. 3 a view of the fixed die block.

Figures 4, 5, 6:
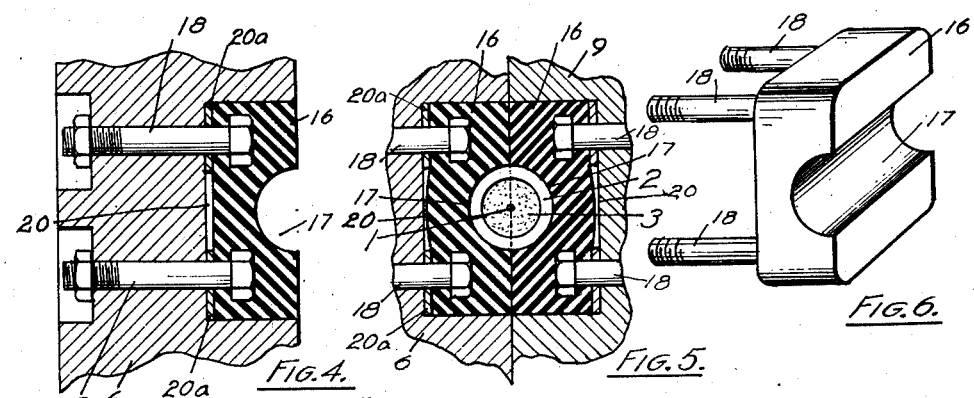

Fig. 4 a section on the line 4—4 in Fig. 2.

Fig. 5 a section on the line 5—5 in Fig. 1 with the mold parts in closed position.

Fig. 6 a perspective view of a rubber insert for the mold.

Figure 7:
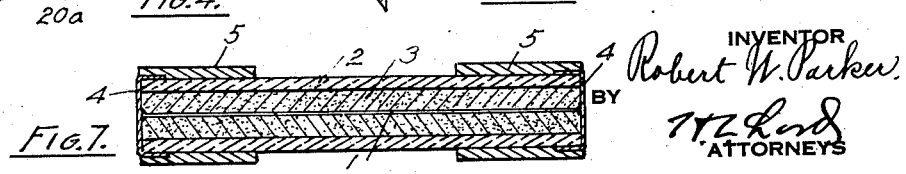

Fig. 7 a sectional view of a fuse which is adapted to be completed in the die casting machine.

1 marks a fuse which is carried in a glass tube 2, the glass tube having a filler 3. Caps 4 are arranged at the ends of the glass tube and as finished, a die cast sleeve 5 extends over the glass and the flange of the cap. The die cast sleeve is formed of a low temperature melting material, a suitable formula being 90 parts tin and 10 of copper.

A fixed mold block 6 is carried by a backing plate 7 and is supplied with die cast material through the tube 8, forcing means being supplied of an ordinary construction (not shown). A movable die block 9 is mounted on a sliding plate 10, the plates being slidingly mounted on rods 11, the rods extending from the plate 7 and being secured together by a backing thrust plate 12. A toggle is mounted between the back plate 12 and the sliding plate 10, the toggle 13 being provided with a handle 14 by means of which the movable block may be moved to close and open the mold.

The mold is provided with a cavity 15 in which is arranged a block of yielding material having a grooved center 17 of a size adapted to engage the outer periphery of the glass shell of the fuse. Bolts 18 are cast in the rubber insert and extend through the blocks and are secured by nuts or suitable means.

Preferably a small space 20 is provided back of the block 16 opposite the groove. This is readily provided by shims 20a. This permits the yielding of the rubber as it engages the insert. The mold blocks have mold cavities 21 conforming to the outer shape of the sleeve and adapted in length to receive a capped glass fuse. As the mold is closed, the yielding part of the mold yields sufficiently to take up any discrepancies in the glass, the rubber forming a closure wall sealing the mold cavity along the glass. Charged channels 22 connect the tube 8 with the die cavities 21.

With the parts in place and the mold closed, fluid die casting material is forced into the cavities and around the glass and cap. In this manner these fuse blocks may be formed with a die cast end suitable for attaching purposes and the sleeve at the end forms a complete and permanent assembly between the caps and the glass.

What I claim as new is:

1. In a die casting machine having die closing and charging mechanisms, the combination with said closing and charging mechanisms of dies having a mold cavity partly walled by metal and partly formed of yielding material such as rubber, the yielding material being adapted to compressively engage a fragile insert in the mold cavity and providing a closure sealed around the insert to complete the mold cavity.

2. In a die casting machine having die closing and charging mechanisms, the combination with said closing and charging mechanisms of dies having a mold cavity walled with metal at the ends and formed of rubber intermediate the ends, said rubber being adapted to compressively engage a fragile insert in the mold cavity and providing a closure sealed around the insert to complete the mold cavities at the ends of the fragile article.

3. In a die casting machine having die closing and charging mechanisms, the combination with said closing and charging mechanisms of dies having a mold cavity walled with metal at the ends and formed of rubber intermediate the ends, said rubber being adapted to compressively engage a fragile insert in the mold cavity and providing a closure sealed around the insert to complete the mold cavities at the ends of the fragile article, the part of the mold opposite the surfaces engaged by the insert having free space to permit the yielding of the rubber.

4. In a die casting machine having die closing and charging mechanisms, the combination with said closing and charging mechanism of dies having a mold cavity having its walls formed partly at least of yielding material such as rubber, the yielding material being adapted to compressively engage a fragile insert in the mold cavity and providing a closure sealed around the insert to complete the mold cavity.

ROBERT W. PARKER.